United States Patent
Suzuki (10) Patent No.: US 6,684,744 B2
(45) Date of Patent: Feb. 3, 2004

(54) PRODUCING METHOD OF FILM WITH THROUGH-HOLES

(75) Inventor: Minoru Suzuki, Tochigi-ken (JP)

(73) Assignee: Pentax Corporation, Tokyo (JP)

( * ) Notice: Subject to any disclaimer, the term of this patent is extended or adjusted under 35 U.S.C. 154(b) by 103 days.

(21) Appl. No.: 09/768,402

(22) Filed: Jan. 25, 2001

(65) Prior Publication Data

US 2001/0002133 A1 May 31, 2001

Related U.S. Application Data

(62) Division of application No. 09/161,306, filed on Sep. 28, 1998, now abandoned.

(30) Foreign Application Priority Data

Sep. 30, 1997 (JP) ............................................. 9-282633

(51) Int. Cl.⁷ ............................ B26D 7/14; B41J 2/005; B41J 2/32
(52) U.S. Cl. ................................. 83/18; 83/30; 83/175; 264/156; 425/290; 425/DIG. 53; 425/DIG. 37; 347/171; 347/1
(58) Field of Search ............................... 83/18, 30, 175, 83/176, 613, 684, 686, 687, 691, 694, 660; 400/237; 347/171, 1, 173; 346/140.1; 430/964; 101/336, 328, 338; 425/290, 324.1, 335, 363, 471, DIG. 37, DIG. 53, DIG. 55; 264/230, 156, 294, 155

(56) References Cited

U.S. PATENT DOCUMENTS

| | | | | |
|---|---|---|---|---|
| 676,782 A | * | 6/1901 | Stimpson | 83/691 |
| 3,678,941 A | * | 7/1972 | Dixon | 131/336 |
| 3,818,789 A | | 6/1974 | Vargo | |
| 4,685,230 A | * | 8/1987 | Mason, III | 38/102.5 |
| 4,970,926 A | * | 11/1990 | Ghajar et al. | 83/468.94 |
| 5,637,166 A | * | 6/1997 | Swanson et al. | 156/73.1 |
| 6,145,976 A | | 11/2000 | Suzuki et al. | |
| 6,236,414 B1 | * | 5/2001 | Suzuki et al. | 346/140.1 |
| 6,296,469 B1 | * | 10/2001 | Suzuki | 425/290 |
| 6,447,976 B1 | * | 9/2002 | Dontula et al. | 430/201 |
| 2001/0002133 A1 | * | 5/2001 | Suzuki | 346/140.1 |

FOREIGN PATENT DOCUMENTS

| | | |
|---|---|---|
| EP | 0254420 | 11/1991 |
| EP | 0682376 | 11/1995 |
| EP | 0710546 | 5/1996 |
| EP | 0719994 | 7/1996 |
| FR | 2646124 | 10/1990 |
| GB | 922131 | 3/1963 |
| GB | 982036 | 2/1965 |
| GB | 1116181 | 6/1968 |
| GB | 1120578 | 7/1968 |
| GB | 1309419 | 3/1973 |
| GB | 1310474 | 3/1973 |
| GB | 2103537 | 2/1983 |
| GB | 2152870 | 8/1985 |
| JP | 57-208250 | * 12/1982 |
| JP | 5305666 | 11/1993 |
| JP | 8-49960 | 2/1996 |
| JP | 10147031 | 6/1998 |
| JP | 10147032 | 6/1998 |

OTHER PUBLICATIONS

An English Language abstract of JP 5–305666.
An English Language abstract of JP 8–049960.
WIP Abstract Accession No. 1990–370377.50.

* cited by examiner

Primary Examiner—Boyer D. Ashley
(74) Attorney, Agent, or Firm—Greenblum & Bernstein, P.L.C.

(57) ABSTRACT

A film is made of an elastic material. The film is stretched in at least one direction in parallel to a surface of the film. Then, through-holes are punched in the film be means of needles, in a state the film is stretched. After the punching is completed, the stretching is terminated, so that the film recovers its original shape.

8 Claims, 7 Drawing Sheets

PRODUCING METHOD OF FILM WITH THROUGH-HOLES

This application is a divisional of U.S. patent application Ser. No. 09/161,306, filed Sep. 28, 1998, the contents of which are expressly incorporated by reference herein in its entirety now abandoned.

BACKGROUND OF THE INVENTION

This invention relates to a producing method of a film with through-holes.

Generally, such film is made of a plastic film. A punching machine is used to form through-holes on the film. The punching machine is arranged to pierce the film with needles. In order to improve the accuracy of dimensions (such as diameters and pitches) of the through-holes, it is necessary to improve an operation accuracy of a punching machine. However, such improvement of the punching machine may increase the producing cost of the film.

Accordingly, there is a strong demand for a producing method of a film with through-holes which achieves a high accuracy of the dimensions of the through-holes, without increasing the producing cost of the film.

Further, it is difficult to produce a film with through-holes which inclination angles (from a direction of a thickness of the film) are relatively large. This is because, when the film is pierced with a needle in an inclined direction, the film tends to be bent.

Accordingly, there is a strong demand for a producing method of a film with through-holes which inclination angles (from a direction of a thickness of the film) are relatively large.

SUMMARY OF THE INVENTION

It is therefore an object of the present invention to provide a producing method of a film with through-holes, which achieve a high accuracy of dimensions of the through-holes without increasing the producing cost of the film.

Further, it is another object of the present invention to make it possible to produce a producing method of a film with through-holes which inclination angles (from a direction of a thickness of the film) are relatively large.

According to an aspect of the present invention, there is provided a method including the steps of (1) stretching the film in at least one direction in parallel to a surface of the film, (2) forming through-holes in the film in a state the film is stretched, and (3) terminating the stretching of the film after the through-holes are formed.

After the stretching is terminated, dimensions of the film in the stretching direction decrease. Thus, error of dimensions (such as diameters and pitches) of the through-holes of the film also decrease. As a result, the accuracy of the dimensions of the through-holes is improved, without improving an operation accuracy (of a punching machine or the like) in the through-hole-forming step. Consequently, it is possible to achieve a high accuracy of the dimensions of the through-holes of the film, without increasing the producing cost of the film.

In the through-hole-forming step, it is preferred to form the through-holes by punching. With this, the producing cost is relatively low (compared with a laser machining or the like).

In a particular arrangement, a clamp mechanism is used in the stretching step. The clamp mechanism holds at least two sides of the film to stretch the film. With this, the film can be continuously stretched by means of a simple mechanism. Also, with such a clamp mechanism, biaxial stretching is enabled.

Further, the through-holes are formed on at least one row in the through-hole-forming step. With this, the produced film can be employed in an ink transfer printer described below. In such case, the through-holes are faced with heating elements of a thermal line head.

According to another aspect of the present invention, there is provided a producing method of a film (made of shape memory resin) with through-holes. The producing method includes the steps of (1) heating the film to a temperature above a glass transition temperature of the shape memory resin, (2) stretching the heated film in at least one direction, (3) cooling the stretched film to a temperature below the glass transition temperature, (4) forming through-holes in the film, and (5) heating the film to a temperature above the glass transition temperature.

As the stretched film is cooled before the film recovers its original (non-stretched) shape, the film is solidified in a state the film is stretched. Thus, it is possible to keep the stretched state of the film without continuously applying force to the film.

In a particular arrangement, a pair of heat rollers are used to heat the film and to stretch the film. The film is inserted in a gap between the rollers and pressed therein, so that the film is stretched. Optionally, a fan is used to cool the film in the cooling step. The fan is located in the vicinity of the heat rollers.

According to still another aspect of the present invention, there is provided a producing method of a film with through-holes. The film is made of shape memory resin. The producing method includes the steps of (1) forming through-holes in the film, (2) heating the film to a temperature above a shape-providing temperature of the shape memory resin, and (3) stretching the film in at least one direction in parallel to a surface of the film, in a state the film is heated to a temperature above the shape-providing temperature.

The produced film is thinner than the film in the through-hole-forming step. Further, dimensions of the 'produced' film in the stretching direction are larger than those of the film in the through-hole-forming step. Thus, the inclination angles of the through-holes (from a direction of a thickness of the film) of the produced film are larger than those of the through-holes formed in the through-hole-forming step. Accordingly, it is possible to produce a film with through-holes which inclination angles (from a direction of a thickness of the film) are relatively large.

In a particular arrangement, a pair of rollers are used in the stretching step. The film is inserted in a gap between the rollers and pressed therein. The rollers are heated to a temperature above the shape-providing temperature.

The film produced by the above-described producing method can be used in an ink transfer printer. The ink transfer printer includes (1) a thermal head comprising a plurality of heating elements, the thermal head being faced with the film so that the heating elements are faced with the through-holes of the film, (2) a space formed between the thermal head and the film, which holds ink therein, (3) a platen member which urges a recording media to a surface of the film. When the heating elements selectively heat the ink in the space and the film, ink permeates the through-holes of the film and transferred to the recording media.

DESCRIPTION OF THE PREFERRED EMBODIMENT

The embodiments of the producing method of a film with through-holes according to the present invention are described below.

Figure 1A:
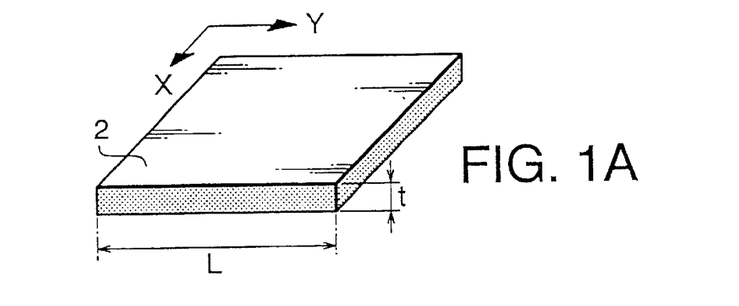
FIGS. 1A, 1B, 1C and 1D are schematic views showing a producing method of a film with through-holes according to a first embodiment.

FIGS. 1A, 1B, 1C and 1D are schematic views showing a producing method of a film with through-holes according to a first embodiment. A film 2 shown in FIG. 1A is made of polytetrafluoroethylene (Teflon (trademark)). The film 2 has a square shape, each side thereof having the length L. The thickness t of the film 2 is from 0.03 to 0.08 mm. In FIG. 1A, X-direction and Y-direction are defined along two adjacent sides of the film 2.

Figure 1B:
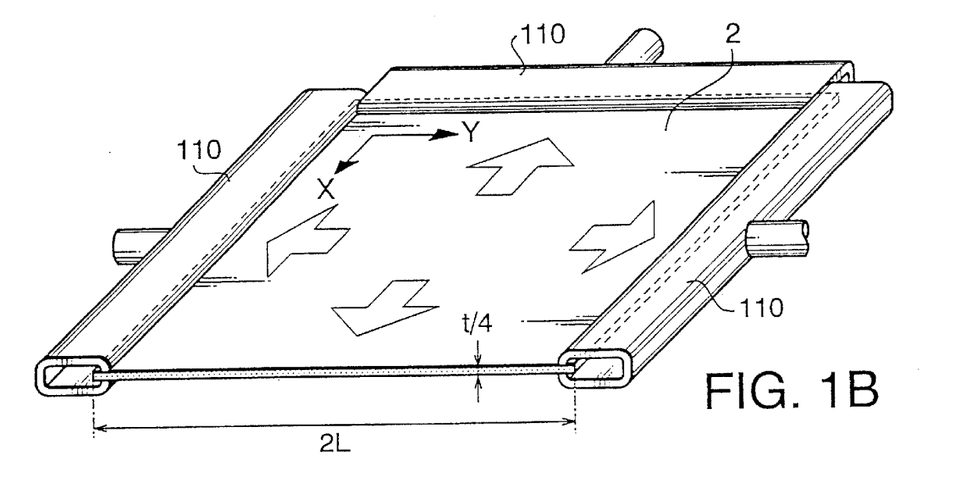

As shown in FIG. 1B, the film 2 is stretched in two directions. A clamp mechanism is used to stretch the film 2. The clamp mechanism has four clamps 110 which respectively hold four sides of the film 2 (one of clamps 110 is not shown in FIG. 1B) and stretches the film 2 in X-direction and Y-direction. The film 2 is stretched so that the length of each side becomes 2L, and so that the thickness of the film 2 becomes t/4.

Figure 1C:
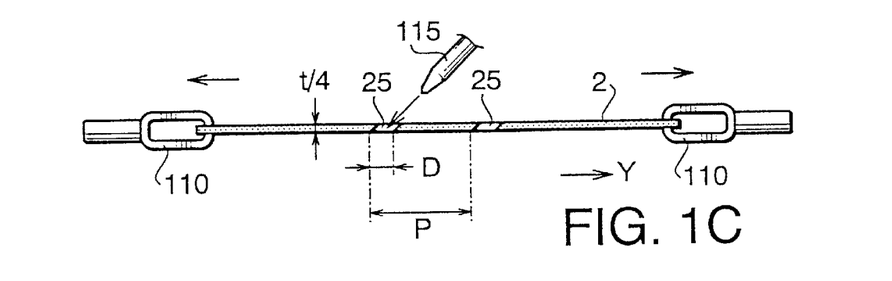
Figure 1D:
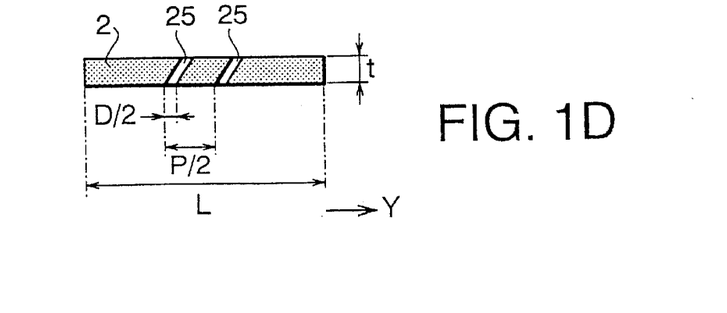
Figure 2:
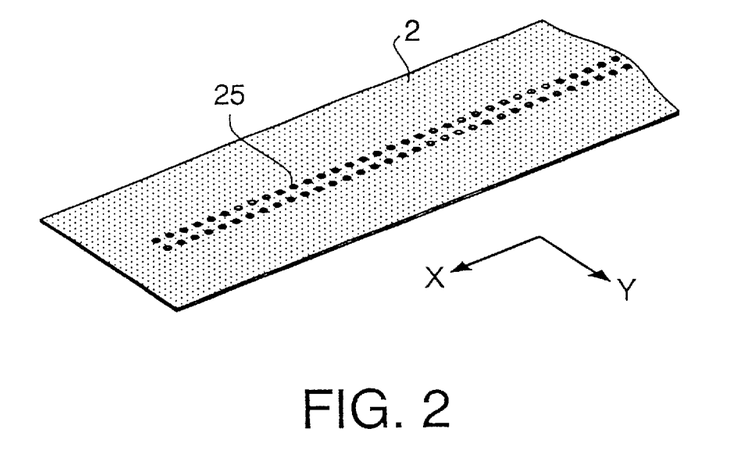
FIG. 2 is a perspective view of the film of FIG. 1.

As shown in FIG. 1C, through-holes 25 are punched in the film 2 by means of needles 115 of a punching machine. The through-holes 25 have a certain diameter D, and are arranged on two rows with a certain pitch P. The film 2 is pierced with the needle 115 in a direction that is inclined from a direction of a thickness of film 2 to Y-direction. That is, the through-holes 25 are inclined to Y-direction. Due to the operation accuracy of the punching machine, error in dimensions (such as diameters and pitches) of the through-holes 25 is approximately 0.02 mm. After the through-holes 25 are formed, the stretching of the film 2 is terminated, so that the film 2 recovers its original (non-stretched) thickness as shown in FIG. 1D. With this, the film 2 with through-holes 25 is produced. The 'produced' film 2 is shown in FIG. 2.

As shown in FIG. 1D, since the film 2 recovers its original (non-stretched) thickness, the thickness of the film 2 changes from t/4 to t. Also, the length of each side of the film 2 changes from 2L to L. Accordingly, the diameter of the through-holes 25 changes from D to D/2. Also, the pitch of the through-holes 2 changes from P to P/2.

As a result, even if the error of the dimensions of the through-holes 25 is 0.02 mm in the punching step (FIG. 1C), the error of the dimensions of the through-holes 25 of the 'produced' film 2 (FIG. 1D) is 0.01 mm. That is, the accuracy of the dimensions of the through-holes 25 is doubled.

As described above, by punching the through-holes 25 in the film 2 in a state the film 2 is stretched, the accuracy of dimensions of through-holes 25 can be consequently improved, without improving the operation accuracy of the punching machine.

In the above-described first embodiment, it is possible to form through-holes 25 throughout the surface of the film 2. Further, it is possible to stretch the film 2 in only one direction (instead of two direction). In case the film 2 is stretched in Y direction, the shape of the through-holes 25 of the produced film 2 is ellipse that is elongated in X direction.

Figure 3:
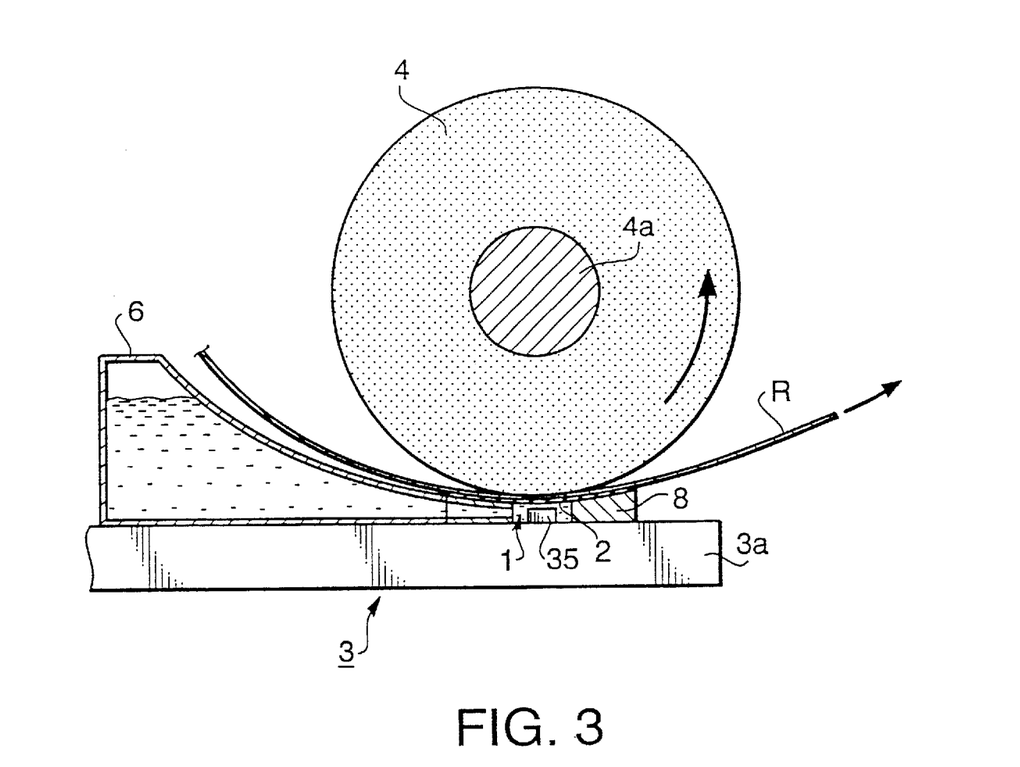
FIG. 3 is a sectional view of a ink transfer printer using the film of FIG. 2.

An ink transfer printer using the film 2 is described. FIG. 3 is a sectional view of the ink transfer printer. The ink transfer printer includes a thermal line head 3 having multiple of heating elements 35 arranged in a row. The above-described film 2 with through-holes (not shown in FIG. 3) is supported by a board 3a of the thermal line head 3 via a spacer 8 provided therebetween, so that the film 2 and the thermal line head 3 are faced with each other.

The spacer 8 and the board 3a of the thermal line head 3 are made of materials which do not allow the permeation of ink. Thus, ink is stored in a space surrounded by the spacer 8, the board 3a of the thermal line head 3 and the film 2. A platen roller 4 is provided at the opposing side of the film 2 with respect to the thermal line head 3, so that a recording media R is sandwiched by the platen roller 4 and the film 2. The circumferential surface of the platen roller 4 is made of rubber. The rotation shaft 4a of the platen roller 4 is orientated in a direction in which the heating elements 35 of the thermal line head 3 are arranged. When the platen roller 4 is rotated, the recording media R is fed in the direction shown by an arrow in FIG. 3, due to a traction between the recording media R and platen roller 4.

Figure 4:
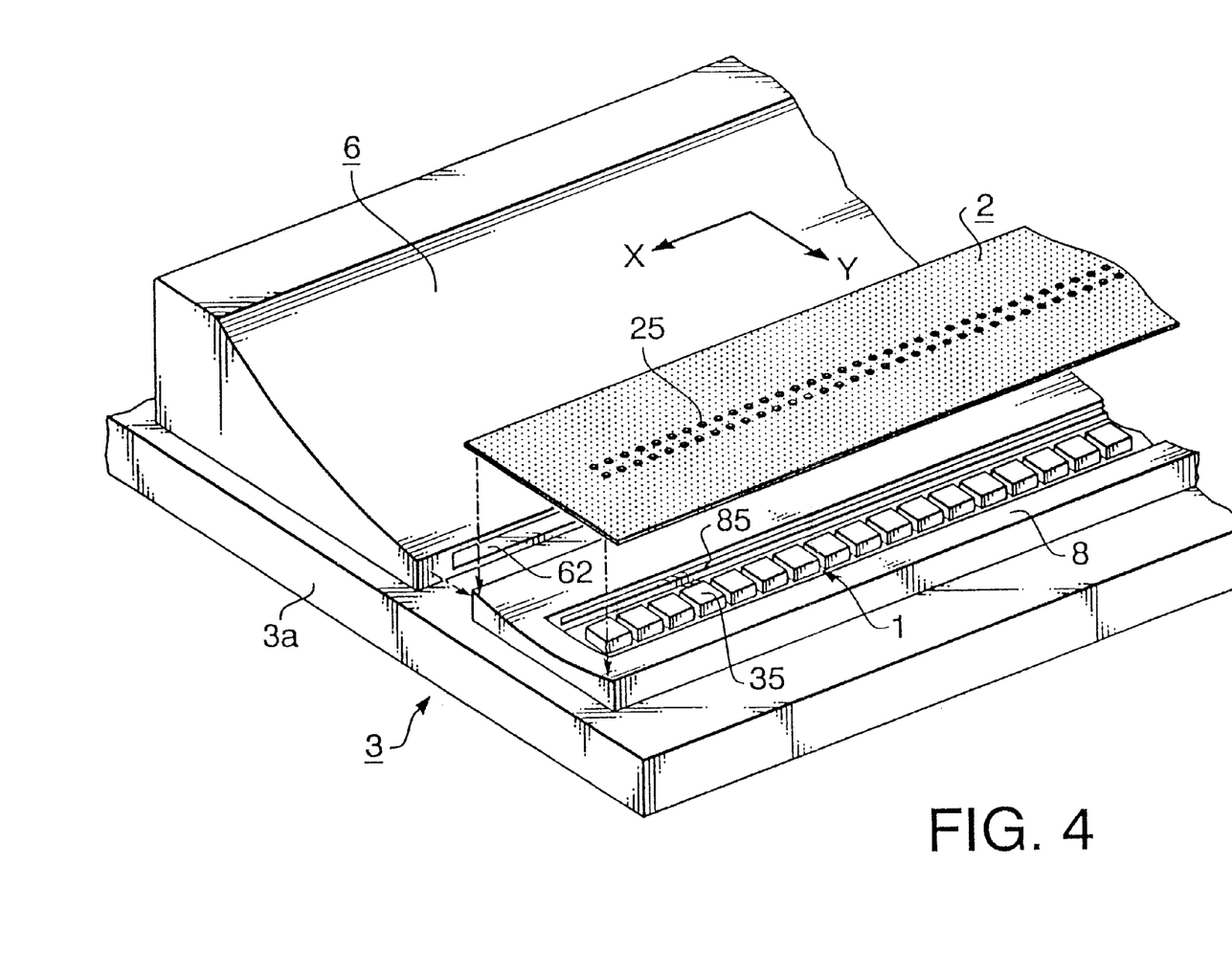
FIG. 4 is an exploded perspective view showing a main part of the ink transfer printer of FIG. 3.

FIG. 4 is an exploded perspective view of the ink transfer printer except the platen roller 4. The spacer 8 is a thin plate member which surrounds the heating elements 35 of the thermal line head 3. That is, the spacer 8 defines four side borders of the ink space 1 in which the heating elements 35 are located. In order to supply ink to the ink space 1, an ink tank 6 is provided on the board 3a of the thermal line head 3 so that the ink tank 6 is adjacent to the spacer 8. The ink tank 6 has a not-shown cavity in which ink can be stored. Ink stored in the ink tank 6 is introduced into the ink space 1 through a slit-shaped outlet opening 62 formed on the ink tank 6 and a slit-shaped connecting opening 85 formed on the spacer 8, due to a capillary action. The film 2 is attached to the upper surface of the spacer 8 so that the through-holes 25 are faced with the heating elements 35 of the thermal line head 3.

Figure 5A:
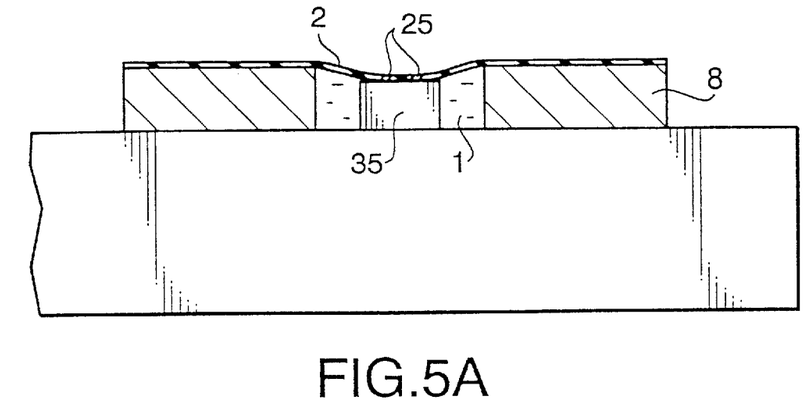
FIGS. 5A and 5B are schematic views illustrating ink transferring process.
Figure 5B:
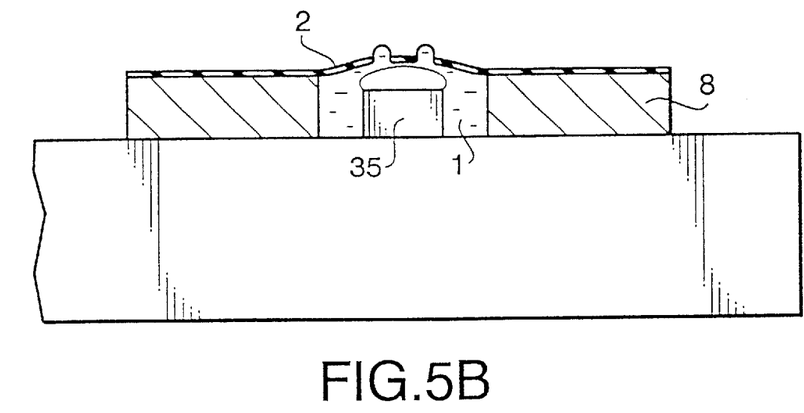

FIGS. 5A and 5B are schematic views showing an ink transferring process. As shown in FIG. 5A, the diameter of the through-holes 25 are small so that ink does not permeate the through-holes 25. The film 2 is almost in contact with the heating element 35 of the thermal line head 3. When the heating element 35 is heated, ink located in the vicinity of the heating element 35 is heated. As shown in FIG. 5B, the heated ink is vaporized and expanded, causing an increase in the local pressure of ink. Also, a portion of the film 2 located in the vicinity of the heating element 35 is heated. The elastic coefficient of the heated portion of the film 2 decreases, so that the heated portion of the film 2 is easily deformed. Due to the increase in the local pressure in ink, ink is pushed into the through-hole 25 of the film 2. Further, the through-hole 25 is widen so as to allow the permeation of ink. With this, ink permeates the through-hole 25 and is transferred onto the recording media R (FIG. 3) which is in contact with the upper surface of the film 2. After the heating of the heating elements 35 is stopped, the heated ink is cooled by the surrounding ink, so that the increase in the local pressure in ink disappears. Further, the heated portion of the film is also cooled by ink. With this, the widened through-holes 25 recover their original diameters so that the through-holes 25 do not allow the permeation of ink.

As constructed above, by controlling the thermal line head 3 to selectively heat the heating elements 35 and by rotating the platen roller 4 to feed the recording media R, a desired image is formed on the recording media R.

Figure 6:
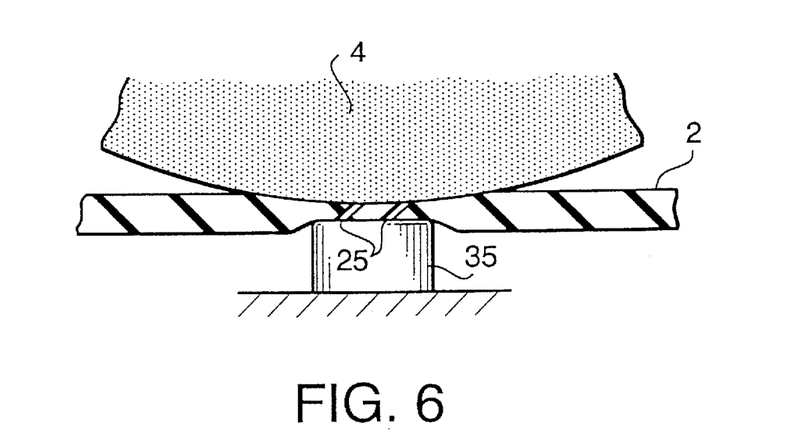
FIG. 6 is an enlarged view of the film nipped by a thermal head and a platen roller of the ink transfer printer of FIG. 3.

In the above-described ink transfer printer, it is possible to arrange that the film 2 is sandwiched by the heating elements 35 and the platen roller 4 as shown in FIG. 6. Since the through-holes 25 of the film 2 is inclined from a direction of the thickness of the film 2, the through-holes 25 are almost closed. With such an arrangement, even if an unintentional pressure is applied to ink (or to the film 2), an unintentional permeation of ink is prevented. Thus, the ink leakage is prevented. Further, it is possible to constitute the spacer 8 of an adhesive agent instead of the thin plate member.

Figure 7:
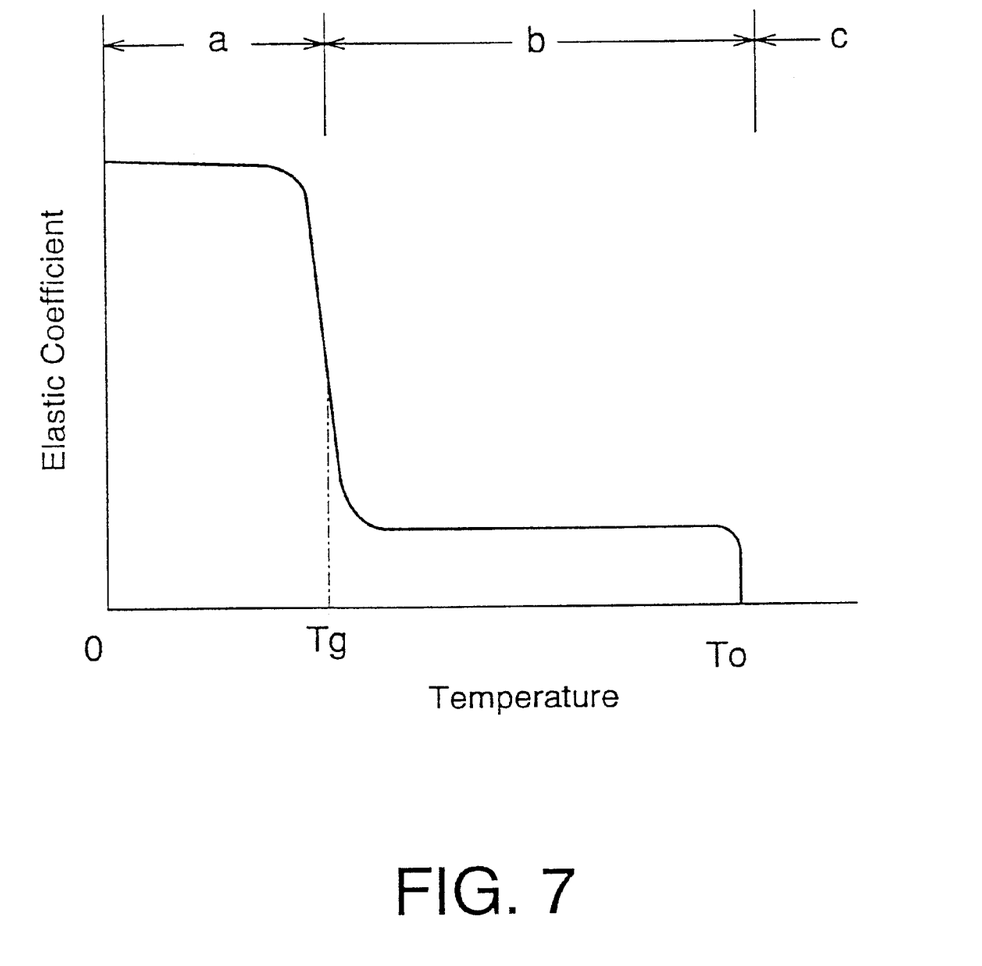
FIG. 7 is a diagram showing an example of a characteristic of a shape memory resin according to the second embodiment.

The second embodiment of the present invention is described. In the second embodiment, a film 200 is made of shape memory resin which exhibits different characteristics above/below a glass transition temperature Tg. FIG. 7 is a diagram showing an example of the characteristics of the shape memory resin. When the shape memory resin is heated to a temperature above a glass transition temperature Tg (and below a shape-providing temperature T0 described below) as shown by "b" in FIG. 7, the shape memory resin exhibits a rubber state, in which Brownian motion of molecules is activated. When the shape memory resin is cooled to a temperature below the glass transition temperature Tg as shown by "a" in FIG. 7, the shape memory resin exhibits a solid state in which Brownian motion of molecules is frozen. Further, if the shape memory resin is heated to a temperature above a shape-providing-temperature T0 as shown by "c" in FIG. 7, the shape memory resin exhibits a fluidized state in which molecules are fluidized. In this fluidized state, the shape memory resin is given an original shape. Examples of the shape memory resin are as follows: (1) polynorbornene, (2) trans-1,4-polyisoprene, and (3) polyurethane. In this embodiment, polyurethane resin (which is low cost and has excellent moldability) is used. In this embodiment, the glass transition temperature Tg of the shape memory resin is from 60_C. to 80_C. The shape memory resin is disclosed in Japanese Laid-Open Patent Application Nos. HEI 5-305666 and HEI 8-49960, teaching of which are incorporated by reference in their entireties.

Figure 8A:
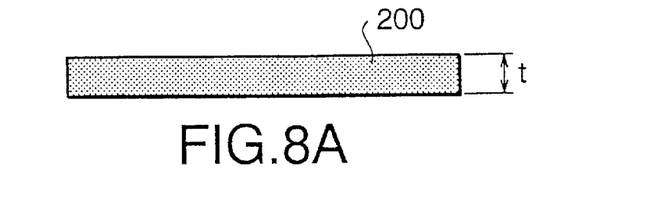
FIGS. 8A, 8B, 8C and 8D are schematic views showing a producing method of a film with through-holes according to the second embodiment.
Figure 8B:
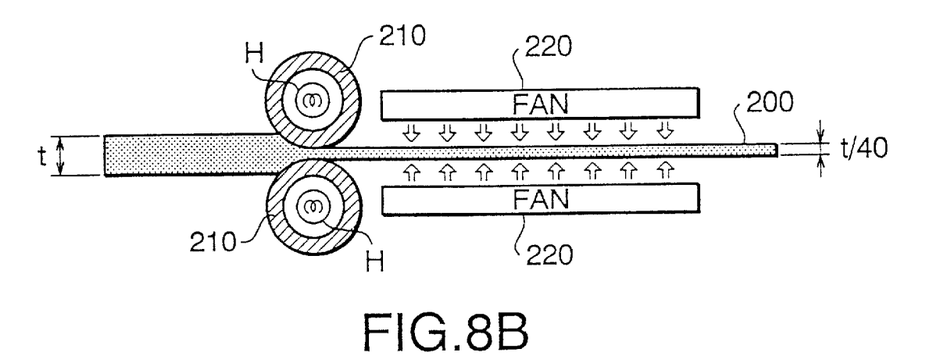

FIGS. 8A, 8B, 8C and 8D are schematic views showing the producing method according to the second embodiment. As shown in FIG. 8A, the film 200 made of the shape memory resin has a thickness t of 2 mm. This film 200 is inserted in a gap between two heat rollers 210. The heat rollers 210 are heated at 70_C., which is higher than the glass transition temperature Tg of the shape memory resin. The film 200 is heated so that the film 200 exhibits a rubber states and pressed by the heat rollers 210, so that the film 200 is stretched in one direction (referred to as Y-direction). The film 200 is stretched so that the thickness of the film 200 is 0.05 mm (t/40). A pair of fans 220 are located at downstream side of the heat rollers 210. The film 200 which moves out of the gap between the heat rollers 210 is rapidly cooled by fans 220 to a temperature below the glass transition temperature Tg. That is, the film 200 is cooled just after the film 200 is stretched and before the film 200 becomes thicker. With this, the film 200 exhibits the solid state in a state the film 200 is stretched.

Figure 8C:
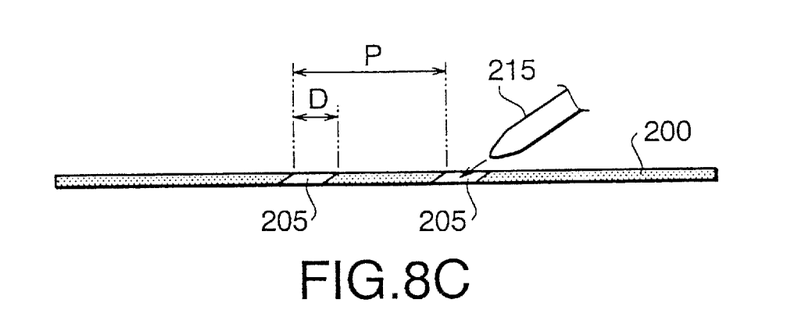
Figure 8D:
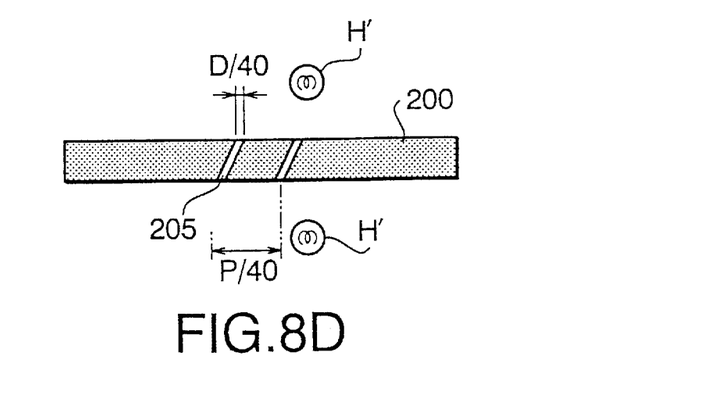

Further as shown in FIG. 8C, through-holes 205 are punched in the film 200 by means of needles 215. The diameters of the through-holes 205 are denoted by D in FIG. 8C. After punching of the through-holes 205, the film 200 is heated to a temperature above a glass transition temperature Tg by means of a heater (denoted by H' in FIG. 8D). As a result, the film 200 recovers its original thickness as shown in FIG. 8D. That is, the thickness of the film 200 is changed from 0.05 mm (t/40) to 2 mm (t). The diameter of the through-holes 205 in the stretching direction (Y-direction) becomes D/40. With this, the film 200 with through-holes 205 is produced. The film 200 produced by the process shown in FIGS. 8A through 8D can be used as a film 2 in the ink transfer printer shown in FIG. 3.

As described above, even if the error in the dimensions (in Y-direction) of the through-holes 205 is 0.02 mm in the punching step (FIG. 8C), the error in the dimensions (in Y-direction) of the through-holes of the produced film 200 is 0.0005 mm. That is, the accuracy of the through-holes of the produced film 200 in Y direction is improved. Further, since the film is solidized in a state the film is stretched, it is possible to keep the stretched state of the film without continuously applying force to the film.

The third embodiment of the present invention is described. In the third embodiment, a film 300 is made of a shape memory resin similar to the second embodiment.

Figure 9A:
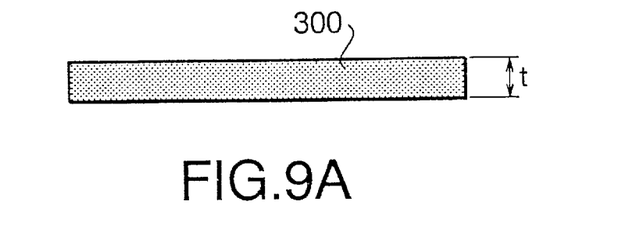
FIGS. 9A, 9B, 9C and 9D are schematic views showing a producing method of a film with through-holes according to the third embodiment.
Figure 9B:
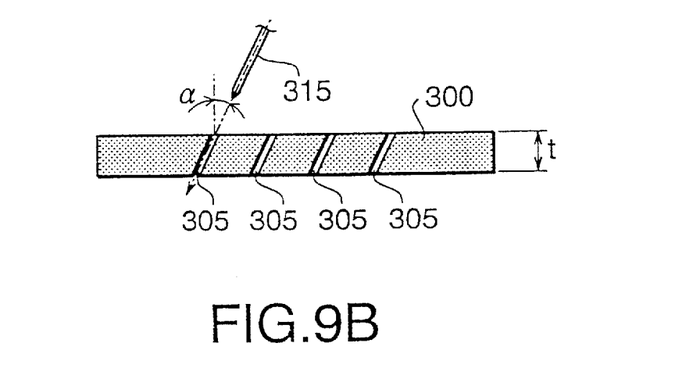

FIGS. 9A, 9B, 9C and 9D are schematic views showing the producing process according to the third embodiment. As shown in FIG. 9A, a film 300 made of the shape memory resin has a thickness t of 2 mm. First, as shown in FIG. 9B, through-holes 305 are punched in the film 300 by means of needle 315. The piercing direction of the needle 315 is inclined to one direction (referred to as Y-direction). The inclination angle of the piercing direction of the needle 315 from a direction of the thickness of the film 300 is denoted by $\alpha$. The diameter of the through-holes 305 is denoted by D in FIG. 8C.

Figure 9C:
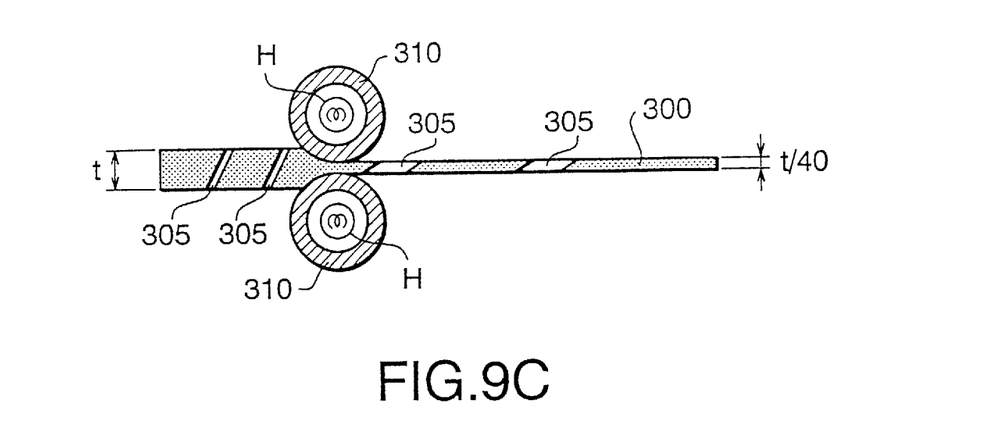

After the through-holes 305 are formed, the film 300 is inserted in a gap between two heat rollers 310 in Y-direction, each heat roller having a heater therein (denoted by H in FIG. 9C). The heat rollers 310 are heated at 150°C., which is higher than the shape-providing temperature T0 of the shape memory resin of the film 300. The film 300 is heated so that the film 300 exhibits a rubber states and pressed by the heat rollers 310, so that the film 300 is stretched in Y-direction. The film 300 is stretched so that the thickness of the film 300 is 0.05 mm (t/40). Since the film 300 is heated to a temperature above the shape-providing temperature T0, this shape of the film 300 (having the thickness of 0.05 mm) becomes an original shape of the film 300. With this, the film 300 with through-holes 305 is produced. The film 300 produced by the process shown in FIGS. 9A through 9D can be used as the film 2 in the ink transfer printer shown in FIG. 3.

Figure 9D:
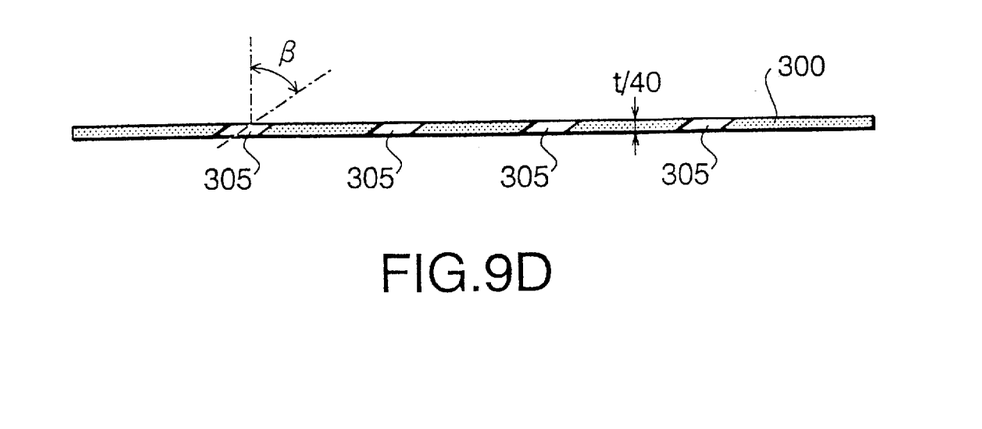

As shown in FIG. 9D, the inclination angle $\beta$ of the through-holes 305 of the 'produced' film 300 from a direction of the thickness of the film 300 is larger than inclination angle (the piercing direction (FIG. 9B) of the needle 315. Accordingly, it is possible to form the film 300 with through-hole 305 which inclination angle from a direction of the thickness of the film 300 is relatively large.

Although the producing method of a film with through-holes is described herein with respect to the preferred embodiments, many modifications and changes can be made without departing from the spirit and scope of the invention.

The present disclosure relates to subject matters contained in Japanese Patent Application No. HEI 09-282633, filed on Sep. 30, 1997, which is expressly incorporated herein by reference in their entirety.

What is claimed is:

1. A producing method of a film with through-holes, said film being made of an elastic material, said method comprising:

stretching said film in at least one direction in parallel to a surface of said film;

forming through-holes in said film in a state said film is stretched such that said through-holes are inclined from a thickness direction of said film to the at least one stretching direction; and terminating said stretching of said film after said through-holes are formed.

2. The producing method according to claim 1, wherein said through-holes are formed by punching in said through-hole-forming step.

3. The producing method according to claim 1, wherein a clamp mechanism is used in said stretching step, and wherein said clamp mechanism holds at least two opposing sides of said film to stretch said film.

4. The producing method according to claim 1, wherein said through-holes are formed on at least one row in said through-hole-forming step.

5. The producing method according to claim 1, wherein biaxial stretching is performed in said stretching step.

6. A film with through-holes produced by the producing method according to claim 1.

7. The producing method according to claim 1, wherein the through-holes are inclined such that the through-holes are substantially closed together when sandwiched between a roller and a heating element.

8. The producing method according to claim 7, wherein said film is used in an ink-transfer printer.

* * * * *